(12) United States Patent
Szczepanik et al.

(10) Patent No.: US 11,782,641 B2
(45) Date of Patent: Oct. 10, 2023

(54) BACKEND AWARE VIRTUALIZED STORAGE

(71) Applicant: International Business Machines Corporation, Armonk, NY (US)

(72) Inventors: Grzegorz Piotr Szczepanik, Cracow (PL); Lukasz Jakub Palus, Cracow (PL); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 17/342,767

(22) Filed: Jun. 9, 2021

(65) Prior Publication Data
US 2022/0398033 A1    Dec. 15, 2022

(51) Int. Cl.
*G06F 12/00* (2006.01)
*G06F 13/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0644* (2013.01); *G06F 3/0647* (2013.01); *G06F 3/0652* (2013.01); *G06F 3/0664* (2013.01)

(58) Field of Classification Search
CPC .... G06F 3/0659; G06F 3/0604; G06F 3/0644; G06F 3/0647; G06F 3/0652; G06F 3/0664; G06F 3/067
USPC ........................................................ 711/154
See application file for complete search history.

(56) References Cited

U.S. PATENT DOCUMENTS

| | | | | |
|---|---|---|---|---|
| 6,237,021 B1 * | 5/2001 | Drummond | ......... | G06F 15/8053 709/201 |
| 8,868,797 B1 * | 10/2014 | Kirac | ...................... | G06F 3/061 710/15 |
| 9,047,017 B1 * | 6/2015 | Dolan | ................... | G06F 3/0685 |
| 9,569,352 B2 * | 2/2017 | Marcu | ................. | G06F 12/0238 |
| 9,646,067 B2 * | 5/2017 | Abercrombie | .......... | G06F 16/27 |

(Continued)

OTHER PUBLICATIONS

Smith, K., "Garbage Collection and TRIM in SSDs Explained—An SSD Primer", SSD Beginner Guides, 3 pages, May 19, 2020, found at the following website: www.thessdreview.com/daily-news/latest-buzz/garbage-collection-and-trim-in-ssds-explained-an-ssd-primer/.

(Continued)

*Primary Examiner* — Sheng Jen Tsai
(74) *Attorney, Agent, or Firm* — Eric Chesley

(57) ABSTRACT

A first backend housekeeping operation of a backend storage system is detected by a storage virtualization system. The first backend housekeeping operation is related to a first backend storage portion of the backend storage system. The storage virtualization system transfers data to the backend storage system for storage and retrieval. The storage virtualization system issues commands to the backend storage system. A first virtualized operation related to a first virtualized storage portion of the storage virtualization system is identified. A storage overhead condition is determined based on the first backend storage portion and based on the first virtualized operation. A storage corrective action is performed based on the storage overhead condition. The storage corrective action prevents the potential performance of one or more additional backend housekeeping operations.

20 Claims, 5 Drawing Sheets

(56) References Cited

U.S. PATENT DOCUMENTS

| | | | |
|---|---|---|---|
| 10,042,853 B2* | 8/2018 | Sundaram | G06F 3/064 |
| 10,496,293 B2* | 12/2019 | Goldberg | G06F 3/0619 |
| 10,705,764 B2* | 7/2020 | Wilcock | G06F 3/067 |
| 2005/0182906 A1* | 8/2005 | Chatterjee | G06F 12/0866 |
| | | | 711/143 |
| 2006/0069844 A1* | 3/2006 | Gallo | G11B 27/002 |
| 2007/0233700 A1* | 10/2007 | Tomonaga | G06F 3/0608 |
| 2012/0042114 A1* | 2/2012 | Young | G06F 3/067 |
| | | | 710/316 |
| 2013/0097369 A1* | 4/2013 | Talagala | G06F 12/0804 |
| | | | 711/103 |
| 2013/0275656 A1* | 10/2013 | Talagala | G06F 12/0246 |
| | | | 711/103 |
| 2014/0279900 A1* | 9/2014 | Gupta | G06F 16/219 |
| | | | 707/634 |
| 2014/0279920 A1* | 9/2014 | Madhavarapu | G06F 16/2365 |
| | | | 707/649 |
| 2014/0372679 A1* | 12/2014 | Flynn | G06F 12/123 |
| | | | 711/103 |
| 2017/0269980 A1* | 9/2017 | Gupta | G06F 11/0772 |
| 2020/0293219 A1* | 9/2020 | Szczepanik | G06F 3/0685 |
| 2022/0171537 A1* | 6/2022 | Szczepanik | G06F 3/0665 |

OTHER PUBLICATIONS

Mell, P. et al., "The NIST Definition of Cloud Computing", Recommendations of the National Institute of Standards and Technology, NIST Special Publication 800-145, 7 pages, Sep. 2011.

* cited by examiner

BACKEND AWARE VIRTUALIZED STORAGE

BACKGROUND

The present disclosure relates to computer storage, and more specifically, to operating a computer storage based on housekeeping operations.

Storage systems and subsystems of computers may be tasked with performing efficient storage and retrieval of data for users and computer programs. A storage system may also perform one or more housekeeping operations to operate more efficiently.

SUMMARY

According to embodiments, disclosed are a method, system, and computer program product.

A first backend housekeeping operation of a backend storage system is detected by a storage virtualization system. The first backend housekeeping operation is related to a first backend storage portion of the backend storage system. The storage virtualization system performs storage operations based on a plurality of logical data structures of one or more client systems. The storage virtualization system transfers data to the backend storage system for storage and retrieval. The storage virtualization system issues commands to the backend storage system. A first virtualized operation related to a first virtualized storage portion of the storage virtualization system is identified. A storage overhead condition is determined based on the first backend storage portion and based on the first virtualized operation. A storage corrective action is performed based on the storage overhead condition. The storage corrective action prevents the potential performance of one or more additional backend housekeeping operations.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
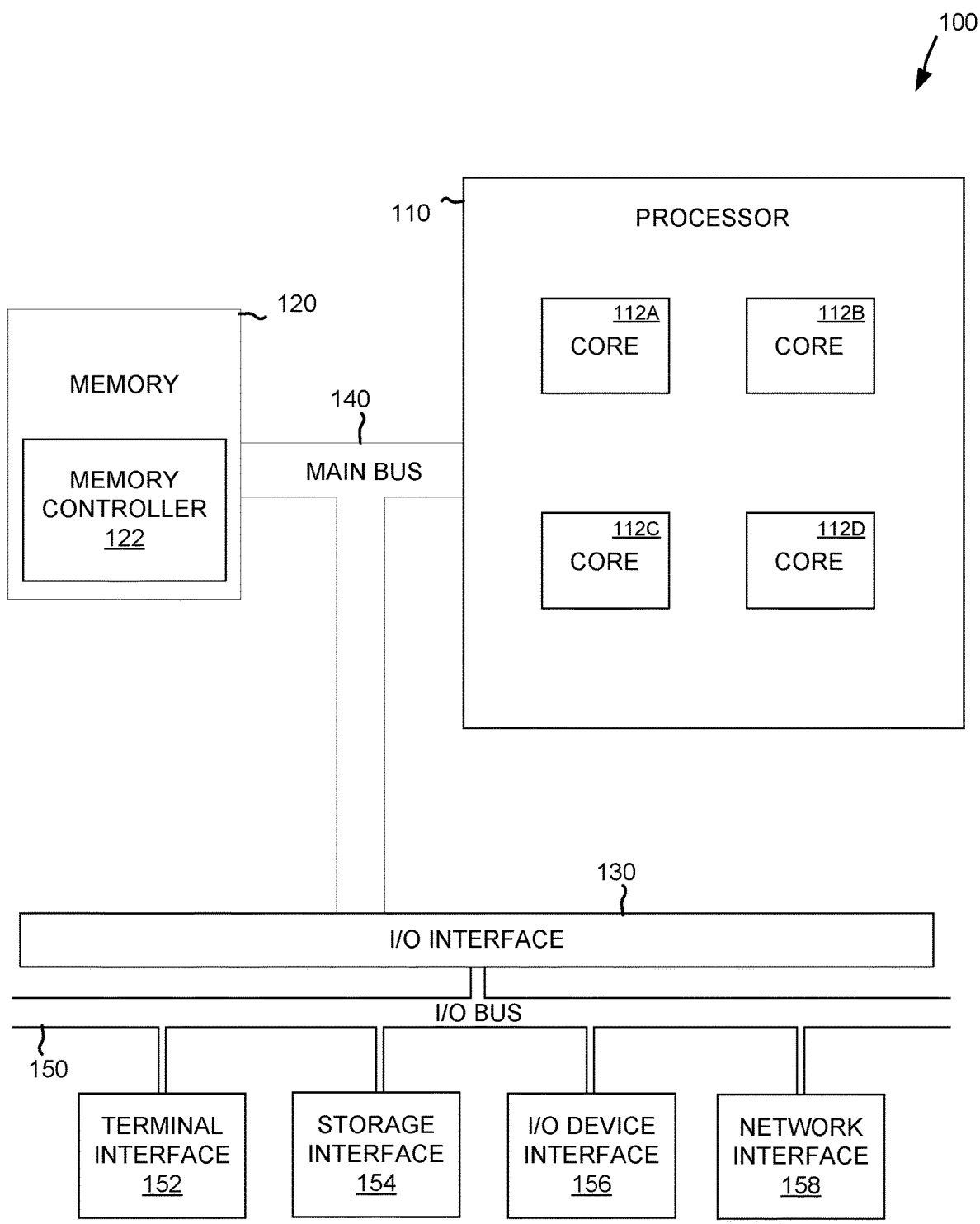
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer storage, more particular aspects relate to operating a computer storage based on housekeeping operations. While the present disclosure is not necessarily limited to such applications, various aspects of the disclosure may be appreciated through a discussion of various examples using this context.

Increasingly, computer resources are provided as abstracted computing resources. Abstracted computing resources may include one or more of the following: processing power, memory availability, and computer storage. Computer storage, for example, may be provided to users, user programs, and other user-facing software in a fashion that is wholly unrelated to the underlying storage devices; a storage virtualization system may be one such abstract. These abstractions are often advantageous for all parties. For example, as the various components of storage devices are connected and presented as a singular resource, it may be less complicated for management and administration. Specifically, storage devices provided as a unified solution that may include a complete Input/Output ("I/O") stack from application layer, to management layer. The actual storage devices where the data and metadata is stored, can be partitioned and administered by a singular storage virtualization system (as opposed to multiple administrative systems, consequently saving time). In another example, users may be able to operate and perform computing tasks without regard to how much computer resources are needed.

Further, abstracted computing resources may provide integrated computing solutions that integrate hardware and software together. Specifically, an integrated computing solution may provide a common set of utilities or functions as a product, service, or other relevant computing solution. An integrated computing solution may include one or more of the following elements: one or more servers to install and run desired applications and capable of providing various processing and memory resources; a storage area network ("SAN") switch or other relevant dedicated high-speed network or subnetwork that interconnects various components; and a plurality of backend storage media, such as disk drives ("disks"), flash memory storage devices ("SSDs"), tape media, or other relevant storage devices having various storage resources. The various storage resources may be abstracted by storage virtualization systems. The storage virtualization systems may be an appliance (e.g., hardware and software) that abstracts the various storage resources. The various components may be presented by a network connection through the SAN switches as part of an integrated or bundled solution.

Users may use the computing resources with no awareness of all of the hidden operations that are performed by the abstracted computing resources. Specifically, a user or application may address various storage devices as if they are a singular volume, a large volume, a plurality of volumes, a database, or other relevant computing construct. These applications and computing constructs may process data with assumptions about the latencies and overhead that may occur with a single storage device, without considering the performance implications of the underlying or backend storage systems. For example, big-data and real-time analytics applications may operate with certain computer resource requirements. These analytics applications may operate with high sensitivity to and assumptions about specific I/O latencies and bandwidth. These analytics applications may operate on specific storage technology, such as tiered computer storage platforms, redundant arrays of independent disks ("RAID"), or flash-based storage devices.

The lack of awareness may create problems for the operation of virtualized or abstracted storage. A storage virtualization system may present to the user or application storage as if it were specific devices or storage technology, but in actuality many operations may be occurring by way of the storage virtualization system. Various portions of data may be modified and/or moved. In detail, a storage virtualization system may present a logical volume or other relevant portion to a user. Simultaneously, the virtualization system may also perform many adjustments to the logical portions of the data that are not specifically related to the use of the user or user application. For example, an adjustment may be data movement, data copying, migration, tiering, snapshotting, backup, restoring, storage device replacement, formatting, partitioning, extent manipulation, or some other relevant operation that is not directly tied to a user-facing program or operation. These adjustments may be considered housekeeping operations by the storage virtualization system; operations that are not necessarily tied to a user operation.

Simultaneously, one or more housekeeping operations of a backend storage system may be performed based on the particular layout of the physical portions of the backend storage. These housekeeping operations may be performed based on the presence, existence, layout, or current makeup of data on the backend storage systems.

In a first example, a housekeeping operation of a flash-based or solid-state storage device ("SSD") may be a garbage collection operation. In an SSD, the flash memory may operate with peculiar differences between a read and a write. In detail, an SSD may be arranged as follows: flash memory is divided into blocks, which is further divided in pages. The various portions of the SSD may only be deleted in very specific ways; a page cannot be overwritten if existing data is already in that page. A larger portion of the SSD, such as a block, must first be erased in its entirety, before the flash memory may be able to write new data to one of the smaller portions, such as a page of the block. To deal with these peculiarities, a housekeeping operation of garbage collection may be performed. The garbage collection of an SSD may include relocating existing data in a portion, such as a first block, to a new portion, such as a second block, and then erasing the entirety of the first block. Only after the invalid data in the first block is erased, may the first block be ready for new valid data to be written. The SSD may execute these operations independently, e.g., a dedicated processor or controller in the SSD may perform housekeeping operations whenever an algorithm in the dedicated SSD processor indicates a particular portion (e.g., page, block, plane) needs to be housekept.

In a second example, certain magnetic rotating disks ("HDDs") may implement an overlapping technology, such as a shingled magnetic recording ("SMR") layout. The SMR layout may be advantageous because of the increased storage density, but additional housekeeping operations may need to be performed. In detail, shingled recording writes new portions, e.g., tracks, that overlap part of the previously written magnetic track, which is how the tracks may be more tightly packed, and consequently, the HDD of an SMR drive is of a higher density. The overlapping-tracks architecture complicates the writing process since writing to one track also overwrites an adjacent track. If adjacent tracks contain valid data, they must be rewritten as well. A housekeeping operation of a SMR HDD may include the performance of selective data migration, or strategic writing. For example, SMR drives may be divided into many append-only (sequential) zones of overlapping tracks that need to be rewritten entirely when full. A dedicated storage device processor or controller of an SMR HDD may selectively write to non-overlapping portions, e.g., zones. The processor may also perform various operations to rewrite or migrate partially filed zones together. For example, a first zone may be 70% full and a second zone may be 15% full and a third zone may be 40% full. To free up the second zone for new incoming writes, the second zone and the first zone may be written together to a fourth zone and then the first and second zones may be able to accept new data, as part of a housekeeping operation of the HDD.

The housekeeping operations of the storage virtualization system may lead to inefficient operation in relation to underlying backend storage systems. Specifically, as various volumes, logical unit numbers ("LUNs"), extends, or other relevant logical portions of a storage virtualization system are manipulated due to a housekeeping operation, the manipulations may cause additional housekeeping operations of the underlying or backend storage systems to occur. In another scenario, a particular storage virtualization system housekeeping operation may interrupt or conflict with an already running backend housekeeping operation.

For example, a relevant software utility or data manager of a virtualized storage system, e.g., a data reduction pool, may have preset rules for performing allocation and housekeeping of various portions of the storage virtualization system. The storage virtualization system may perform a garbage collection across the various virtualized volumes when a certain amount of free space is left (e.g., below a certain threshold) in a data pool. The garbage collection of the reallocation and migration of certain extents or other relevant portions at the storage virtualization system may cause instructions to move certain data on the backend storage systems. This is done when a certain amount of free space is left in the pool of the storage virtualization system. Here the storage virtualization system software initiates the garbage collection and reallocation of used blocks in the extents. Meanwhile, the backend storage system may now have to perform additional housekeeping operations, to fulfill the housekeeping operations.

In another example, a backend storage system may already be performing one or more housekeeping operations such as a garbage collection. During the existing backend housekeeping operation, the storage virtualization system may determine that a particular tiering, snapshotting, or other relevant storage virtualization system housekeeping operation should be performed. As the backend storage systems have already initiated a backend housekeeping operation, the backend housekeeping operations may be interrupted, extended, delayed, or restarted due to the storage virtualization system housekeeping. The storage virtualization system housekeeping may cause additional or unnecessary storage commands to be pushed down to the backend storage system.

In yet another example, if a large file is deleted by a user-facing application, the storage virtualization system may need to adjust one or more extents or shrink a user-facing volume in anticipation of providing additional virtualized storage for other users or applications. Partially filled extents at the virtualized storage may need to be freed up and storage virtualization system housekeeping of extent freeing and garbage collection at the virtualized layer may need to occur. Again, these operations at the storage virtualization system may cause backend portions of the backend storage system to be freed, moved, or otherwise modified to align with the new storage virtualization system layout or logical makeup after the housekeeping. The dedicated processor or controller of the backend storage system may have already identified the same portions of the backend storage as those that need to be cleaned up as part of a backend storage. Consequently, the unawareness of the storage virtualization system and the backend storage system may result in the same types of backend storage operations being repeated unnecessarily.

Backend aware virtualized storage ("BAVS") may alleviate or prevent the unnecessary duplication or inefficient usage of backend storage systems that are a part of a storage virtualization system. The BAVS may detect a backend housekeeping operation. The BAVS will determine a particular portion or portions (e.g., extents, blocks, pages, planes, tracks, sectors) of a backend storage system is/are affected as part of the backend storage system housekeeping. The BAVS will also identify operations of the storage virtualization systems, e.g., virtualized operations. The BAVS may determine, based on the various backend housekeeping operations and based on the operations of the storage virtualization system, that a particular storage overhead condition exists. Based on the determination of any overhead conditions that exist, the BAVS may be configured to perform a storage corrective action. Storage corrective actions may include delaying a particular command from the storage virtualization system to the backend storage system or delaying performance of a particular storage virtualization housekeeping operation.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively, 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases
automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two
or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
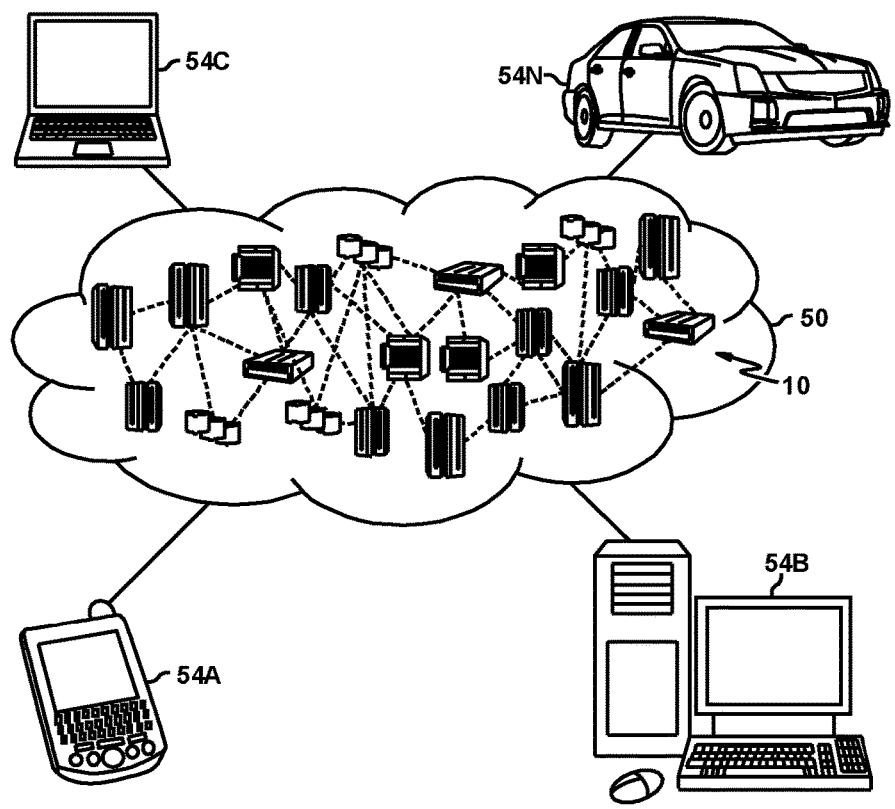
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
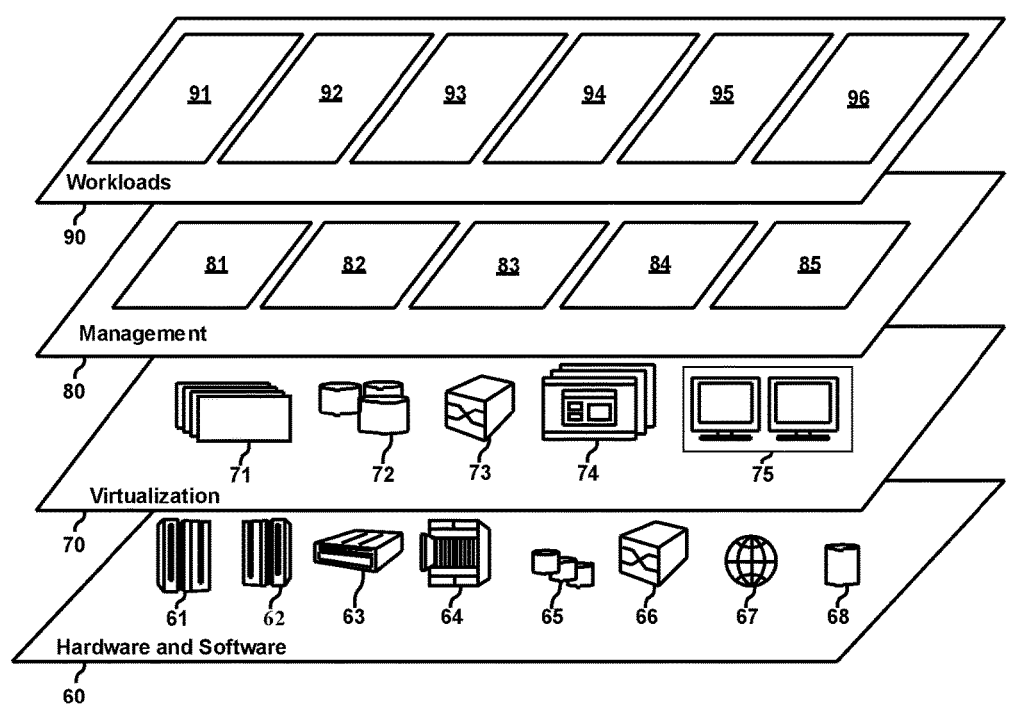
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and BAVS 96.

Figure 4:
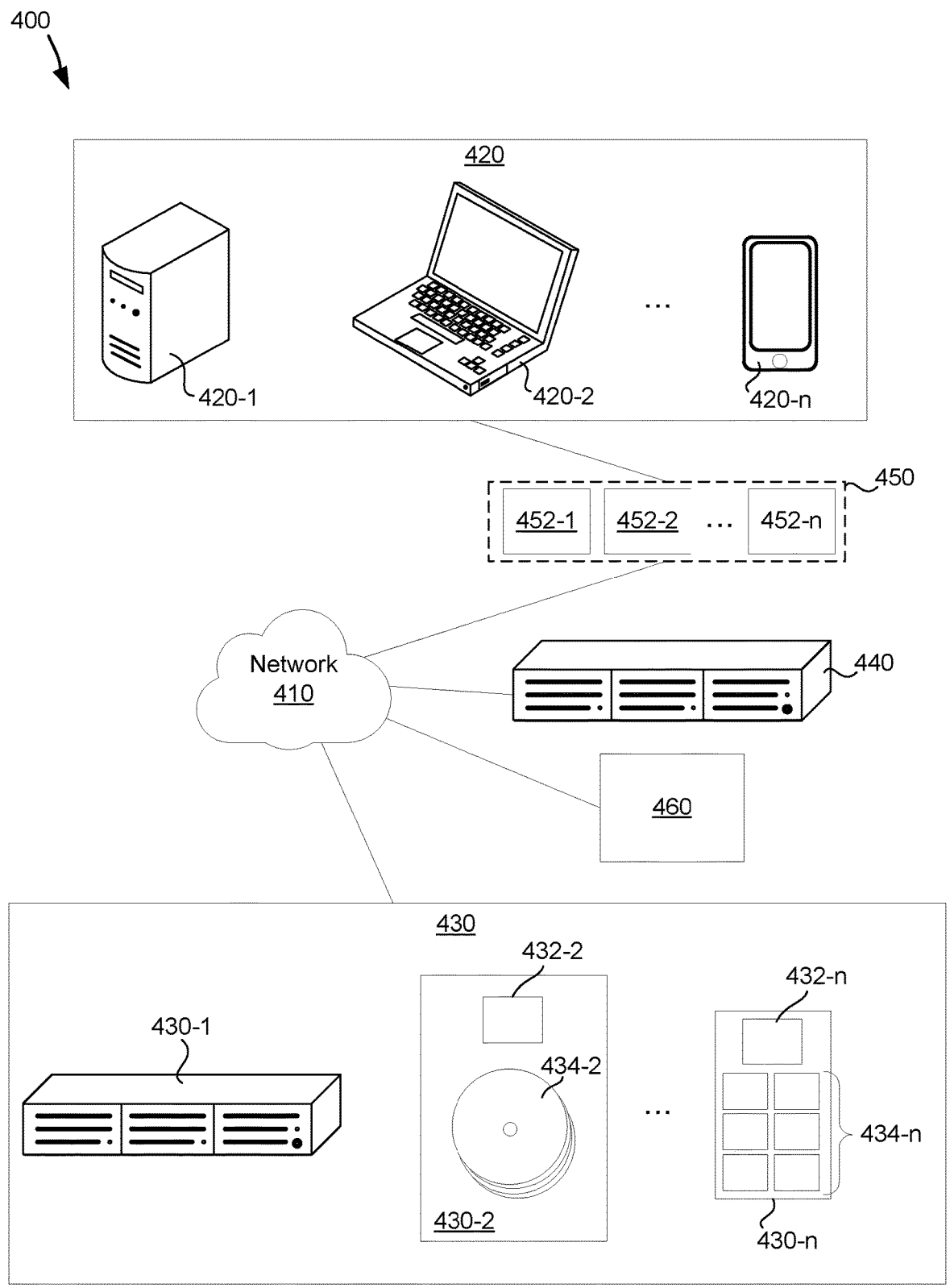
FIG. 4 depicts an example system of backend aware virtualized storage ("BAVS"), consistent with some embodiments of the disclosure.

FIG. 4 depicts an example system 400 of backend aware virtualized storage ("BAVS"), consistent with some embodiments of the disclosure. System 400 may include one or more of the following: a network 410 for facilitating communication between the various components of the system; a plurality of client systems 420-1, 420-2, up to 420-*n* (collectively, 420); a plurality of backend storage systems 430-1, 430-2, up to 430-*n* (collectively, 430); a storage virtualization system 440, and BAVS 460. The network 410 may be a local area network configured to receive and transmit packets between various devices and systems (e.g., Ethernet). The network 410 may be a part of a wide area network configured to facilitate communication across geographic distances (e.g., the Internet). The network 410 may be a dedicated storage network, including one or more storage fabric and other specialized devices (not depicted).

The client systems 420 may be one or more computing devices that operate at a user level. Each client system 420, may be a single computer, such as computer 100, or a part of an abstracted computing resources, such as cloud computing environment 50. Each client system 420 may be configured to perform various tasks for users that involve the use of computing storage. For example, client system 420-1 may be a server configured to execute a database that stores and retrieves various database entries. In another example, client system 420-2 may execute an instance of client relationship management software solution that creates and updates various client records. In yet another example, client system 420-*n* may execute terminal software that retrieves and presents data records. In various instances, the client systems 420 may store records through an application programming interface ("API") of a software suite or may storage records to a storage that appears as a local or network volume ("volume") from an operating system or hypervisor executing on the client systems 420. The volumes may be accessed through network 410.

The backend storage systems 430 may be one or more computing devices that provide access to physical storage to network 410. The backend storage systems 430 may be configured to store and retrieve data based on requests from various other components of system 400. For example, backend storage system 430-1 may be a SAN applicant, RAID array, or computer system, such as computer 100, configured to host storage and provide access to one or more additional backend storage devices (not depicted). In another example, backend storage system 430-2 may be a single magnetic storage device, configured to store and retrieve data. Backend storage system 430-2 may include a storage controller 432-2, and one or more portions 434-2 of storage. Specifically, storage controller 432-2 may be an integrated circuit that processes storage commands and the portions 434-2 may be sectors, tracks, or other relevant subdivision of the magnetic storage of the backend storage system 430-2. In yet another example, backend storage system 432-*n* may be a singled solid state storage device, configured to store and retrieve data. Backend storage system 430-*n* may include a storage controller 432-*n*, and one or more portions 434-*n* of storage. Specifically, storage controller 432-*n* may be an integrated circuit that processes storage commands and the portions 434-*n* may be planes, blocks, pages, cells, or other relevant subdivision of the flash-based storage of the backend storage system 430-*n*.

Each of the backend storage systems 430 may perform one or more housekeeping operations for more efficient operation and storage. Specifically, the backend storage systems 430 may perform garbage collection, caching to various internal memories and other relevant caches (not depicted), or migrations between various portions of data. The backend storage systems 430 may perform these operations based on external commands (e.g., TRIM or unmount commands). The backend storage systems 430 may perform these operations in response to internal logic. For example, the storage controller 432-2 of backend storage system 430 may execute routines based on logic that is a part of a read-only memory (not depicted) or as part of a firmware. The backend storage systems 430 may perform the backend storage housekeeping operations based on various conditions that exist within the storage. For example, storage controller 432-*n* may perform a garbage collection operation based on a certain portion 434-*n* of storage having a certain pre-determined condition. The pre-determined condition may be that a certain percentage or amount of pages are written with data in a given block. The garbage collection operation may migrate written data from a plurality of blocks into a new block, and free up the pages (e.g., erase, set to all zeros, set to all ones) the various cells in the pages of the existing blocks after writing to the new block. The performance of the various backend housekeeping operations may be exposed through a backend API. For example, an operating system, storage virtualization software, or other relevant computing construct may request from a given backend storage system 430 an amount of storage space or portion that is full. In another example, a relevant computing construct may request, through the backend API, for a list of physical portions, such as blocks, pages, indexes, to be garbage collected and then erased in a next housekeeping operation.

The storage virtualization system 440 may be configured to virtualize storage for the client systems 420. Storage virtualization system 440 may be a singular computer system, such as computer 100. Storage virtualization system 440 may be a part of an abstracted computer resource, such as abstract computing environment 50. Storage virtualization system 440 may be configured to provide storage to client systems 420 in an abstracted or virtualized manner. In detail, storage virtualization system 440 may be a storage system that prevents or does not permit direct access to the backend storage systems 430. Any request or hosting of a computing resource for and to a particular client system 420 may be redirected to the storage virtualization system 440. Storage virtualization system 440, may instead redirect all storage requests to a virtualized or logical storage 450 of storage virtualized by the storage virtualization system.

The logical storage 450 may be a storage that is presented to the client systems 420 by the storage virtualization system 440. The logical storage 450 may be an abstraction or representation of the backend storage systems 430. In detail, the logical storage 450 may include a plurality of logical or virtualized storage portions 452-1, 452-2, up to 452-*n* (collectively, virtualized portions 452). The virtualized portions 452 may be volumes, extents, storage pools, virtual drives, abstracted devices, or other relevant logical representations of storage. For example, as client systems 420 perform computing tasks, they write to the virtualized portions 452 as if they were actual physical devices. Responsive to reads, writes, and other I/O from the client systems 420, the storage virtualization system 440 may perform I/O to the virtualized portions 452, and further translate the I/O operations of the virtualized portions 452 to the backend storage systems 430.

BAVS 460 may be configured to perform backend-aware storage operations for storage virtualization systems, such as storage virtualization system 440. BAVS 460 may operate as or be a part of a utility, process, subroutines, algorithms, daemons, jobs, or other relevant software. BAVS 460 may be a collection of hardware and software, such as a computer (e.g., computer 100) that executes separately from the storage virtualization system 440. BAVS 460 may be software and/or hardware that is integrated into the storage virtualization system 440. For example, BAVS 460 may be a module, subroutine, job, interface, kernel extension, or other relevant computing resource that operates as part of the administrative and management system software and/or firmware that executes on the storage virtualization system 440.

The BAVS 460 may be configured to detect backend housekeeping operations of the backend storage systems 430. In detail, each of the backend storage systems 430-1, 430-2, and 430-n may independently operate to move data around (e.g., based on algorithms stored in controllers 432-2) and provide storage space concurrent with the housekeeping operations. The BAVS 460 may be able to detect the various operations at different times or periods of times in relation to a backend storage operation. A different period of time may include a current backend housekeeping operation being performed at the time of detection. A different period of time may include a future backend housekeeping operation queued by the backend storage system. A different period of time may include a future backend housekeeping operation that is to be performed based on a predetermined condition. A predetermined condition may be one or more operations, patterns, data storage patterns, current makeup, or layout of the various portions 434 of the backend storage systems 430, or various instructions or series of instructions from a storage controller 432, that indicate a backend housekeeping operation is to happen. For example, backend storage system 430-2 may be performing a garbage collection at a first time period. The BAVS 460 may utilize an API or other communication protocol to determine the operations of the backend storage system 430-2.

The BAVS 460 may also be configured to determine one or more operations of the storage virtualization system 440. The operations may be internal operations, such as storage virtualization housekeeping operations that are unrelated to access requests (e.g., reads, writes) to the logical storage 450 by the client systems 420. For example, the BAVS 460 may be able to determine a tiering operation to move one or more of the virtualized storage portions 452 from a first physical location to a second physical location among the various backend storage systems 430. In another example, the BAVS 460 may determine a flash copy operation used for snapshotting or backing up of a volume, logical extent, or other virtual storage portion 452. In yet another example, the BAVS 460 may determine a present or scheduled load balancing operation used to move data between various storage portions 452. In yet still another example, a data migration operation may be occurring to move data between various LUNs or other virtual storage portions 452.

The operations determined by the BAVS 460 may also be external to the storage virtualization system 440. For example, one or more commands may be received or detected from a client system 420 from an exposed API, operating system command queue, or other relevant system. The commands from the client systems 420 may be based on the data that is relevant to the user-facing program, such as a delete command, a table drop command, a move from one logical location to another in a file system, a data deletion timeline of one or more records, or the like. The commands from the client systems 420 may be based on client system housekeeping. These client commands that are external to the storage virtualization system 440 may implicate the storage virtualization system. In detail, the client systems 420 may be under the impression that the logical storage 450, is in fact physical storage devices (e.g., drives, tapes, SANs). As the client systems 420 are under this impression of operating physical storage devices, they may need to, as part of client-level housekeeping, issue various commands, such as a TRIM command, a delete command, an unmap command, or other relevant client command to their perceived physical storage devices.

By determining one or more operations of the storage virtualization system 440, the BAVS 460, may identify a virtualized operation that is directed to a given portion 452 of the virtualized storage 450. Further, the BAVS 460 may be configured to determine a storage overhead condition based on the backend storage operations and virtualized storage operations. Specifically, the BAVS 460 may be able to identify a virtualized operation of the storage virtualization system 440 and an associated portion 452 of the virtualized storage 440 that corresponds to the portions 434 of one or more of the backend storage systems 430. The storage overhead condition may include a potential performance of one or more additional backend housekeeping operations of the backend storage system 430. The storage overhead condition may be that multiple redundant operations are being performed at a particular backend storage system 430. The storage overhead condition may be that a particular housekeeping operation of a backend storage system 430 may be interrupted, delayed, or error out.

The BAVS 460 may be configured to perform one or more storage corrective actions in response to or based on detecting a storage overhead condition. For example, storage virtualization system 440 may perform a move of one or more data from a first portion 452-1 to another portion 452-2. The storage virtualization system 440 may also instruct the backend storage systems 430 to update based on the new data that was moved to portion 452-2. The BAVS 460 may determine that the backend storage systems 430 may or may no be ready to perform a housekeeping operation, such as garbage collection, on portions 434 that correspond to portion 452-1 of the storage virtualization system 440. The BAVS 460 may perform a corrective action to instruct a delay of any operations to issue instructions related to data stored at portion 452-1, and consequently no instructions may be sent to backend storage systems 430 related to deallocation or freeing of space. As a result of the delay by the BAVS 460, the backend storage systems 430 may perform less or reduced garbage collection or other relevant backend housekeeping operations.

In another example, portion 434-2 may have a first backend extent with 60 garbage blocks and a second backend extent with 80 garbage blocks. Storage controller 432-2 may move 20 used data blocks from the first extent to the second extent. As a result, the first extent now has 40 garbage blocks and the second extent has 100 garbage blocks. The storage virtualization system 440 may identify that the second extent as free and useable by various portions 452 of virtualized storage 450 (e.g., for child pools, for auto-expansion of volumes). The storage virtualization system 440 may allow for usage of blocks of storage only when the blocks that are a certain predetermined size (e.g., 5 gigabytes) are all filled with garbage data and storage virtualization housekeeping operations may be performed. Instead of issuing a command to consolidate all of the various blocks in the portion 434-2 of the backend storage system 430-2, the BAVS 460 may perform a corrective action by adjusting the mapping of various portions 434-2 to point to the various extents that do have free space for providing portions 452 of virtualized storage 450. This corrective action of adjusting the mapping instead of issuing a consolidation of storage command to the backend storage system 430-2 may save additional overhead, such as write amplification or other backend housekeeping operations.

In yet another example, the BAVS 460 may identify a target of a storage virtualization operation of the storage virtualization system 440, such as a flash copy, a data migration, or another data related operation. The identification may be that a particular daemon, job, data migration or copy manager, or other relevant component, or software subsystem of the storage virtualization system 420 has generated or queued an instruction to perform the storage virtualization against one or more portions 452 of the virtualized storage 450. Additionally, the BAVS 460 may collect from the backend storage system 430, information about the various portions 434 (e.g., backend extents) that may be included as part of a backend housekeeping operation. This backend housekeeping operation may be a garbage collection operation that includes a portion 434 of the backend storage system 430 that may be a target of the storage virtualization operation of the storage virtualization system 440. The writing to a portion 452 that corresponds to a portion 434 that is or will soon be the subject of a backend housekeeping operation may be a storage overhead condition. Specifically, the storage overhead condition may be a copy to or write data to a target in the virtualized storage 450 that corresponds to a backend portion 434 that has a pending or already active deallocation, garbage collection, or other backend housekeeping operation. The storage overhead condition may be a data update to a target in the virtualized storage 450 that corresponds to a backend portion 434 over a threshold size, specifically an amount of updates or writes to the backend portion 434 that may cause the backend storage system 430 to perform a backend housekeeping operation. The storage corrective action may be to select a new backend portion 434, such as a portion that was already the subject of a backend storage housekeeping operation, for the target of the writes, updates, or activity of the virtualized storage 450. This storage corrective action of selecting the new backend portion 434, may also include updating the one or more portions 452 of the virtualized storage 450. Specifically, the storage corrective action may include updating any pointers, log entries, or other metadata to indicate the new location in the backend storage system 430 as the location of the portions 452 of the virtualization storage 450.

Figure 5:
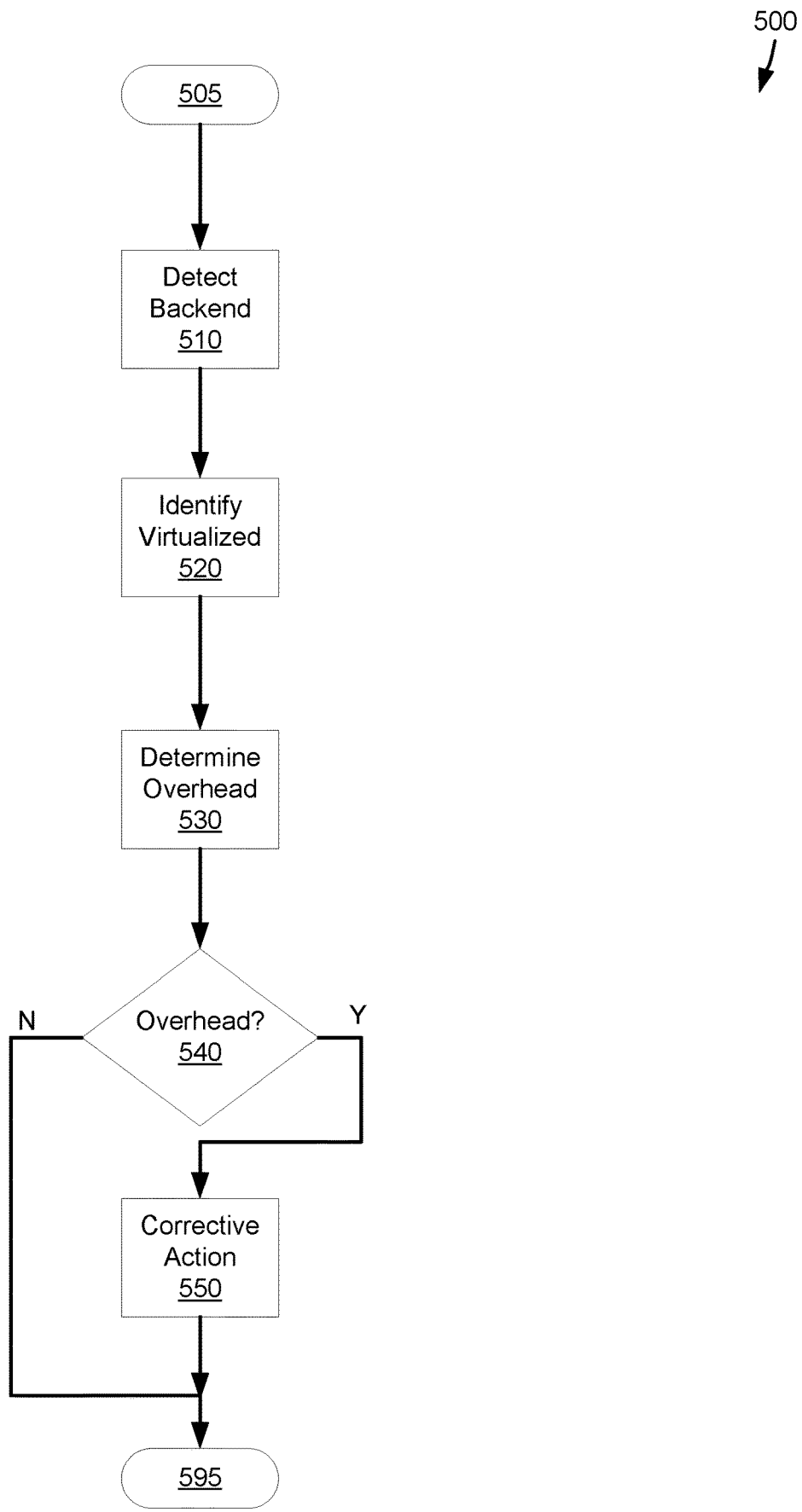
FIG. 5 depicts a method for operation of a storage system, consistent with some embodiments of the disclosure.

FIG. 5 depicts a method 500 for operation a storage system, consistent with some embodiments of the disclosure. Method 500 may generally be implemented in fixed-functionality hardware, configurable logic, logic instructions, etc., or any combination thereof. For example, the logic instructions might include assembler instructions, instruction set architecture ("ISA") instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). One or more operations of method 500 may be performed by components of a storage virtualization system, such as storage virtualization system 440, BAVS 460 of system 400, one or more additional computing devices (e.g., computer 100), or some combination.

From start 505, a backend housekeeping operation may be detected at 510. The backend housekeeping operation may be detected by determining a timeline or other relevant indicator that a particular backend housekeeping operation is to be performed. The backend housekeeping operation may be detected by scanning the current layout of the backend storage system, and by determining the current layout is indicative of a potential backend housekeeping that may be performed. For example, by determining that a high number of pages of a particular block have been written to, it may be determined that a backend housekeeping operation to perform garbage collection on the block may be likely to occur.

At 520, a virtualized operation related to a virtualized portion of a virtualized storage system may be identified. The virtualized portion of an operation may be identified by receiving a command or operation from a client system that is directed to the virtualized portion, such as a database program performing a write operation that is directed to storage that is virtualized by a storage virtualization system. The virtualized portion may be identified by detecting an internal housekeeping operation, such as a storage virtualization system performing one or more copy, move, tiering, or other relevant housekeeping operations against a particular storage.

At 530, a storage overhead condition may be determined. The determination may be based on the backend housekeeping operation, that was detected at 510. The determination may be based on the virtualized portion that was the target of the virtualized operation of the storage virtualization system at 520. The determination may be based on determining that an operation of the virtualized storage system may cause a repeated operation in a backend storage operation. Specifically, a determination that an operation of the virtualized storage system may include the virtualized storage system to transmit an operation to the backend storage system that causes a second backend housekeeping operation. For example, a determination that a virtualized storage system operation includes an unmap, deallocate, or delete command that may be transmitted to a first extent or other particular portion of the backend storage system. Continuing the example, the backend storage system may already be scheduled to perform a garbage collection or other housekeeping operation on the particular portion, and consequently the particular portion would be freed of data.

If a storage overhead condition is determined at 540:Y, then a storage corrective action may be performed at 550. The storage corrective action may be not performing a particular command. For example, a delete command may be issued by a storage virtualization system towards a backend storage system, and the corrective action may be to intercept and cancel the delete command. In another example, an unmap command may be generated to a message queue that is directed to a particular storage device, and the corrective action may be to remove the unmap command from the message queue. The storage corrective action may be to change the target of a particular virtualized storage.

After the storage corrective action is performed at 550, or after a storage overhead condition is not determined at 540:N, method 500 ends at 595.

Method 500 may further be explained by way of an example scenario. In the example scenario, a backend housekeeping operation may be detected at 510. Specifically, a backend storage system may perform a housekeeping operation that includes moving data from a first block and moving data from a second block into a third block. The backend housekeeping operation may also include freeing the first block and the second block, in preparation for future writes. The backend housekeeping operation may be detected by assessing the current number of free pages in the first block and also the particular data that is in the first block, and likewise with the second block. Continuing the example scenario, a first virtualized operation may be detected at 520. Specifically, a storage virtualization system may independently be issued a write operation to a particular portion of virtualized storage. The write command may be a part of an update received from a virtual reality application executing on a client machine that receives storage from the storage virtualization system. Continuing the example scenario, a storage overhead condition may be determined at 530. The storage overhead condition may be a determination that the portion of virtualized storage is stored in the first block of the backend storage system. The storage overhead condition may further be determined based on the number of empty pages in the first block being below a predetermined threshold. The predetermined threshold can be a percentage of pages (e.g., 10% of pages) or a set number of pages (e.g., 14 pages). The corrective action may be to delay the instruction of the storage virtualization system to perform the write until the housekeeping operation has completed, such that a second housekeeping operation is not created.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a storage virtualization system, a first backend housekeeping operation of a backend storage system,
      wherein the first backend housekeeping operation is related to a first backend storage portion of the backend storage system,
      wherein the storage virtualization system performs storage operations based on a plurality of logical data structures of one or more client systems,
      wherein the storage virtualization system transfers data to the backend storage system for storage and retrieval, and
      wherein the storage virtualization system issues commands to the backend storage system;
   identifying a first virtualized operation of the storage virtualization system related to a first virtualized storage portion of the storage virtualization system that corresponds to the first backend storage portion of the backend storage system;
   determining, based on the first backend storage portion and based on the first virtualized operation, a storage overhead condition; and
   performing, based on the storage overhead condition, a storage corrective action that delays storage virtualization system operations that issue instructions related to the first backend storage portion so that no instructions related to the first backend storage portion are sent to the backend storage system during the delay, wherein the storage corrective action prevents potential performance of one or more additional backend housekeeping operations.

2. The method of claim 1, wherein the first virtualized operation includes an internal housekeeping operation of the storage virtualization system.

3. The method of claim 2, wherein the first virtualized operation is a tiering operation.

4. The method of claim 1, wherein the first virtualized operation is an update from a first client of the one or more client systems, and wherein the method further comprises:
   requesting, from the first client, a data deletion timeline of the update, wherein the update is related to the first virtualized storage portion.

5. The method of claim 4 further comprising:
   requesting, from the backend storage system, a data deletion timeline of the first backend storage portion.

6. The method of claim 1, wherein the backend storage system is a second storage virtualization system.

7. The method of claim 1, wherein the backend storage system is a storage device.

8. The method of claim 1, wherein the first virtualized storage portion is a logical extent of a first volume provided to a first client system of the one or more client systems, and wherein the first backend storage portion is a physical extent of the backend storage system.

9. The method of claim 1, wherein the first backend housekeeping operation is a garbage collection operation related to the first backend storage portion.

10. The method of claim 9, wherein the first virtualized operation is an unmap operation of the storage virtualization system, and wherein the storage corrective action includes not communicating the unmap operation to the backend storage system.

11. The method of claim 9, wherein the first virtualized operation is a delete operation of the storage virtualization system.

12. The method of claim 11, wherein the storage corrective action comprises:
   cancelling a transmission of a delete command to the backend storage system, wherein the delete command corresponds to the delete operation.

13. The method of claim 1, wherein the first backend housekeeping operation is a future backend housekeeping operation, and wherein the identification is identifying a queued command of a storage controller of the backend storage system.

14. The method of claim 1, wherein the method further comprises:
   determining, by the storage virtualization system, the first backend housekeeping operation has been performed by the backend storage system;
   identifying an update to one or more second backend storage portions of the backend storage system, wherein the second backend storage portions correspond to one or more second virtualized storage portions of the storage virtualization system; and
   updating a pointer in the storage virtualization system, wherein the pointer corresponds to the one or more second virtualized storage portions.

15. A storage virtualization system, the system comprising:
   a memory, the memory containing one or more instructions; and
   a processor, the processor communicatively coupled to the memory, the processor, in response to reading the one or more instructions, configured to:
      detect a first backend housekeeping operation of a backend storage system,
         wherein the first backend housekeeping operation is related to a first backend storage portion of the backend storage system,
         wherein the storage virtualization system performs storage operations based on a plurality logical of data structures of one or more client systems,
         wherein the storage virtualization system transfers data to the backend storage system for storage and retrieval, and wherein the storage virtualization system issues commands to the backend storage system;

identify a first virtualized operation of the storage virtualization system related to a first virtualized storage portion of the storage virtualization system that corresponds to the first backend storage portion of the backend storage system;

determine, based on the first backend storage portion and based on the first virtualized operation, a storage overhead condition; and perform, based on the storage overhead condition, a storage corrective action that delays storage virtualization system operations that issue instructions related to the first backend storage portion so that no instructions related to the first backend storage portion are sent to the backend storage system during the delay, wherein the storage corrective action prevents potential performance of one or more additional backend housekeeping operations.

16. The system of claim 15, wherein the first virtualized operation includes an internal housekeeping operation of the storage virtualization system.

17. The system of claim 15, wherein the first virtualized operation is an update from a first client of the one or more client systems, and wherein the processor is further configured to:

requesting, from the first client, a data deletion timeline of the update, wherein the update is related to the first virtualized storage portion.

18. A computer program product, the computer program product comprising:

one or more computer readable storage media; and program instructions collectively stored on the one or more computer readable storage media, the program instructions configured to:

detect, by a storage virtualization system, a first backend housekeeping operation of a backend storage system, wherein the first backend housekeeping operation is related to a first backend storage portion of the backend storage system, wherein the storage virtualization system performs storage operations based on a plurality of logical data structures of one or more client systems, wherein the storage virtualization system transfers data to the backend storage system for storage and retrieval, and wherein the storage virtualization system issues commands to the backend storage system;

identify a first virtualized operation of the storage virtualization system related to a first virtualized storage portion of the storage virtualization system that corresponds to the first backend storage portion of the backend storage system;

determine, based on the first backend storage portion and based on the first virtualized operation, a storage overhead condition; and perform, based on the storage overhead condition, a storage corrective action that delays storage virtualization system operations that issue instructions related to the first backend storage portion so that no instructions related to the first backend storage portion are sent to the backend storage system during the delay, wherein the storage corrective action prevents potential performance of one or more additional backend housekeeping operations.

19. The computer program product of claim 18, wherein the first virtualized operation includes an internal housekeeping operation of the storage virtualization system.

20. The computer program product of claim 18, wherein the first virtualized operation is an update from a first client of the one or more client systems, and wherein the program instructions are further configured to:

requesting, from the first client, a data deletion timeline of the update, wherein the update is related to the first virtualized storage portion.

* * * * *